(12) United States Patent
Dewa et al.

(10) Patent No.: US 9,753,190 B2
(45) Date of Patent: Sep. 5, 2017

(54) ADHESIVE WITH EMBEDDED WAVEGUIDES FOR CURING

(71) Applicant: Corning Incorporated, Corning, NY (US)

(72) Inventors: Paul Gerard Dewa, Newark, NY (US); Justin Paul Gales, Macedon, NY (US); Robert Dennis Grejda, Fairport, NY (US); Todd Robert McMichael, Rochester, NY (US); Paul John Shustack, Elmira, NY (US)

(73) Assignee: Corning Incorporated, Corning, NY (US)

( * ) Notice: Subject to any disclaimer, the term of this patent is extended or adjusted under 35 U.S.C. 154(b) by 567 days.

(21) Appl. No.: 14/012,355

(22) Filed: Aug. 28, 2013

(65) Prior Publication Data

US 2015/0064447 A1 Mar. 5, 2015

(51) Int. Cl.
*G02B 1/12* (2006.01)
*G02B 7/182* (2006.01)
*G02B 7/02* (2006.01)
*G02B 5/02* (2006.01)
*C08K 7/18* (2006.01)
*C09J 11/00* (2006.01)
*B32B 7/12* (2006.01)
*B32B 38/00* (2006.01)
*C09J 4/00* (2006.01)
*C09J 5/00* (2006.01)
*C09J 11/04* (2006.01)

(52) U.S. Cl.
CPC ............. *G02B 1/12* (2013.01); *B32B 7/12* (2013.01); *B32B 38/0008* (2013.01); *C08K 7/18* (2013.01); *C09J 4/00* (2013.01); *C09J 5/00* (2013.01); *C09J 11/04* (2013.01); *G02B 7/025* (2013.01); *G02B 7/182* (2013.01); *G02B 5/0242* (2013.01); *G02B 5/0268* (2013.01); *G02B 5/0294* (2013.01); *Y10T 428/259* (2015.01); *Y10T 428/31515* (2015.04)

(58) Field of Classification Search
None
See application file for complete search history.

(56) References Cited

U.S. PATENT DOCUMENTS

| 5,221,387 A | 6/1993 | Robbins et al. |
| 6,097,536 A | 8/2000 | Bauer et al. |
| 6,285,496 B1 | 9/2001 | Bauer et al. |
| 6,835,679 B2 | 12/2004 | Bilanin et al. |
| 7,081,278 B2 | 7/2006 | Lipson et al. |
| 7,232,595 B2 | 6/2007 | Coykendall et al. |
| 7,256,221 B2 | 8/2007 | Coykendall et al. |
| 8,492,448 B2 | 7/2013 | Dewa et al. |
| 8,591,087 B2 | 11/2013 | Bickham et al. |
| 2003/0223131 A1* | 12/2003 | Kuczynski ............ G02B 7/025 359/819 |
| 2004/0092618 A1 | 5/2004 | Coykendall et al. |
| 2008/0193744 A1 | 8/2008 | Fawdington et al. |
| 2013/0090402 A1* | 4/2013 | Dewa .................... G02B 7/025 522/1 |

FOREIGN PATENT DOCUMENTS

| EP | 0895113 | 2/1999 |
| JP | 62184079 | 12/1987 |
| JP | 2012227436 | 11/2012 |

OTHER PUBLICATIONS

PCT_US_2014052605_Se arch_Report.
Yahathugoda, D., Evans, N., Endruweit, A., Long, A., SAMPE Europe Conference and Exhibition, Paris, Apr. 2007.
Graham Town, "Leaky optic fibres full of possibilities", Nov. 24, 2008. http://www.abc.net.au/science/articles/2008/11/24/2428060.htm.
Graham Town, "Leaky Optic Fibers Full of Holes Open Doors to Lots of Opportunities", Nov. 24, 2008. http://www.infoniac.com/science/leaky-optic-fibers-full-of-holes.html.
Al-Obaidani, A., PhD Dissertation, Univ. of Nottingham, Div. of Matls. Mechanics and Structure, May 2009.
Al-Obaidani, A., et al., 13th European Conference on Composite Materials (ECCM13), Jun. 2-5, 2008, Stockholm, Sweden.

* cited by examiner

*Primary Examiner* — Sheeba Ahmed
(74) *Attorney, Agent, or Firm* — Svellana Z. Short; Joseph Gortych

(57) ABSTRACT

An optical device includes a support structure configured to retain an optical element using a cured adhesive composition that is disposed between a surface of the support structure and a surface of the optical element, wherein a structured optical particulate material is dispersed throughout the cured adhesive. The structured optical particulate material redirects curing radiation via a scattering mechanism to facilitate curing of portions of the adhesive compositions that cannot be directly exposed to the radiation, thereby facilitating rapid and more thorough curing than could otherwise be achieved without the structured optical particulate material.

20 Claims, 2 Drawing Sheets

ADHESIVE WITH EMBEDDED WAVEGUIDES FOR CURING

CROSS-REFERENCE TO RELATED APPLICATIONS

Not Applicable.

FIELD OF THE DISCLOSURE

This disclosure relates to adhesive and more particularly to radiation curable adhesive compositions used for attaching an optical element to a structure that is configured to support the optical element.

BACKGROUND OF THE DISCLOSURE

Radiation-curable adhesive compositions are employed in a variety of applications in which a durable, permanent bond or seal between parts is desired. The use of an adhesive provides a cost-effective alternative to mechanical mounts that imparts less stress on the parts being joined together. In many cases, it is possible to expose all portions of the curable adhesive composition to direct radiation, such as when the adhesive is positioned entirely within a gap between parts that are to be bonded together or sealed, or when at least one of the parts is transparent to radiation of the frequency (or wavelength) needed to cure (chemically harden) the adhesive composition. However, in many cases, it is not possible to directly expose all portions (i.e., the entire volume or mass) of the radiation-curable adhesive composition to radiation of a frequency (or wavelength) that will initiate curing of the adhesive composition (i.e., an actinic radiation), such as when at least a portion of the adhesive composition is disposed between parts comprised of a material that blocks the actinic radiation. Also, a light blocking coating may be applied over a surface of the optical element to obstruct or block radiation that would cause degradation of the adhesive. The unexposed portions of the adhesive composition may cure very slowly, resulting in unacceptably long fixing times. Accordingly, there has been a recognized need to provide structures and processes that facilitate rapid curing of those portions of a radiation-curable adhesive or sealant composition that cannot be exposed directly to the actinic radiation (e.g., along a straight line from the radiation source to the adhesive).

U.S. Patent Application Publication No. 2013/0090402 A1 describes the use of a light-diffusing optical fiber that is coupled to an actinic light source and is at least partially disposed within a portion of a radiation-curable adhesive composition that is located in a region between parts (e.g., a holder and an optical element) that are to be joined together, which region is blocked from receiving radiation directly from an external source. While providing a workable solution to the problem of exposing a radiation-curable composition that is blocked from being irradiated by an external source to actinic radiation, this technique is relatively expensive due to the added steps of providing a light-diffusing optical fiber coupled to an actinic light source, and properly positioning the light-diffusing optical fiber within the adhesive composition to facilitate exposure of the composition to actinic radiation and rapid curing.

SUMMARY OF THE DISCLOSURE

Disclosed is a radiation-curable adhesive composition that is capable of scattering actinic radiation. More particularly, the composition allows sufficient scattering and redistribution of the actinic radiation to facilitate rapid curing of a portion of the composition that is blocked from receiving actinic radiation directly from an external source, and which is contiguous with a different portion of the composition that is not blocked from receiving actinic radiation directly from the external source.

The radiation-curable adhesive composition that is capable of scattering actinic radiation to facilitate rapid curing of a portion of the adhesive that is blocked from directly receiving actinic radiation may include a photocurable material and a structured optical particulate material dispersed throughout the photocurable material, wherein the structured optical particulate material is capable of scattering the actinic radiation throughout the photocurable material.

Also disclosed are optical devices having an optical element adhesively joined to a support structure using a cured adhesive composition as described herein, and processes for attaching an optical element to a support structure using a disclosed radiation-curable adhesive composition that is capable of scattering actinic radiation.

DETAILED DESCRIPTION OF THE DISCLOSED EMBODIMENTS

Figure 1:
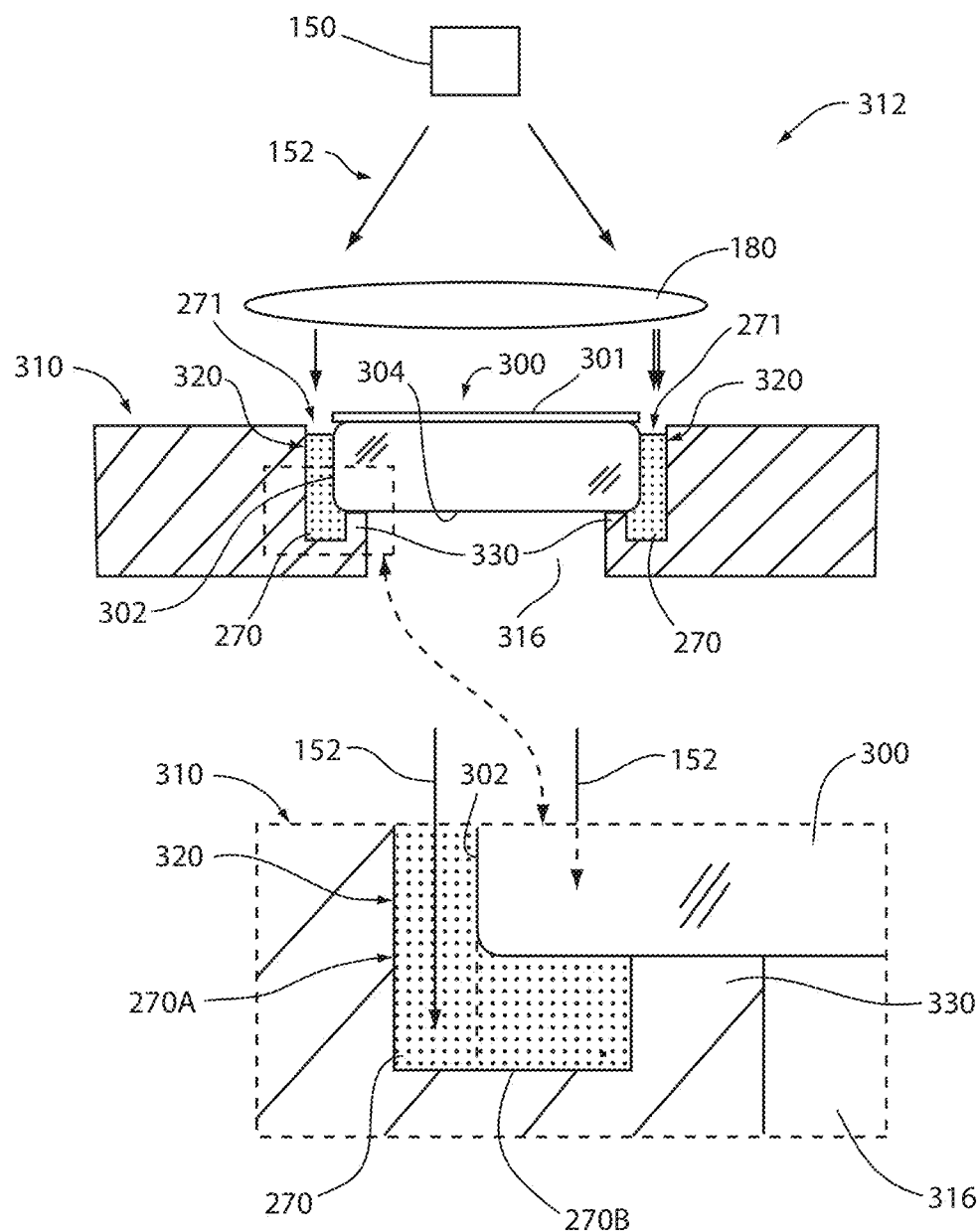
FIG. 1 is a schematic diagram of a known optical device receiving actinic radiation from an external radiation source to induce curing of an adhesive disposed between a support structure and an optical element, with the close-up inset illustrating that the radiation does not reach a portion of the adhesive disposed directly beneath a coating that blocks light of a wavelength spectrum that causes degradation of the adhesive.

The radiation-curable adhesive compositions employed in the various embodiments and aspects of this disclosure are flowable compositions that can be exposed to radiation (e.g., ultraviolet radiation or electron beam) to cause the composition to solidify and harden by chemical reactions such as polymerization and/or cross-linking employing any of a variety of different chemistries. These photocurable compositions may comprise a combination of small molecules (e.g., monomers), oligomers and polymers, and for example include radiation-curable epoxy, oxetane, vinyl ethers, propenyl ether, crotyl ether, allyl ether, propargyl ether, maleate ester, fumarate ester, cinnamate ester, styrenic, acrylamide, methacrylamide, acrylate, methacrylate, maleimide and thiol-ene based resin compositions.

The term "adhesive composition" as used herein and in the claims is meant to encompass sealants and potting compositions having an adhesive quality (i.e., the ability to bond to a surface of a support structure and to an optical element held on the support structure).

Dispersed in the photocurable liquid is a structured optical particulate material that is capable of collecting and scattering radiation, including at least radiation of a frequency (or wavelength) that is capable of inducing curing of the photocurable liquid. The structured optical particulate material can be uniformly distributed in the photocurable liquid using a mechanical mixing apparatus. Generally, the small particle size of the structured optical material, combined with the viscosity of the photocurable material, as well as the relatively small difference in the density (or specific gravity) of the structured optical material as compared to the photocurable material prevents rapid settling, allowing storage of the adhesive composition for a reasonable period before remixing is needed prior to use.

Factors that affect the light scattering properties of the structured optical material include particle size and asphericity, the wavelength of the actinic radiation that is to be scattered, the ratio of the refractive index of the structured optical material relative to the refractive index of the photocurable liquid, and surface roughness of the structured optical particulate material. The structured optical particulate material could be any particulate material capable of transmitting and/or reflecting the actinic radiation capable of inducing photocure. The particulate could be organic (e.g., synthetic or natural polymers, etc.) or inorganic (e.g., glass, ceramic, glass-ceramic, minerals, etc.). The particles may be regular in shape (e.g., spheroid or cylindrical), fibrous, or can be irregular in shape as in the particles obtained from grinding. An example of a structured optical material that may be used is fused silica microspheres. Such particles can have a diameter of from about 30 to about 300 microns. Other structured optical materials may include glass or polymer microspheres or aspherical particles (e.g., spheroid or cylindrical).

The amount of structured optical material that may be incorporated into the adhesive composition is not particularly limited. In general, the particulate structured optical material is added in an amount that is sufficient to improve adhesion by scattering curing radiation to portions of the adhesive that would not otherwise be exposed to the curing radiation, while avoiding excessive amounts of the structured optical particulate material that would adversely affect adhesive properties or the cohesive strength of the cured composition. Exemplary amounts are 0.01% to 50%, 0.1% to 30%, 0.5% to 25%, 1% to 20%, 2% to 15% and 5% to 10% of the total weight of the adhesive composition.

In certain aspects of this disclosure, the structured optical material can be selected to absorb light of a wavelength that is different from that of the actinic radiation that causes curing of the photocurable liquid material. More particularly, the absorbed wavelength can be a wavelength or wavelength spectrum or range that has a degradative effect on the cured adhesive composition. Alternatively, a second particulate material can be dispersed in the adhesive composition to absorb degradative radiation.

FIG. 1 illustrates a known optical device 312 having an optics mount or support structure 310 having a central aperture 316 defined by an inner ring 320, which is defined in part by a lip 330 configured to receive an optical element 300 that is ultimately secured to the support structure by a reacted photocurable adhesive material 270. An actinic radiation source 150 is used to direct radiation 152 to the photocurable material 270 to induce curing thereof. A lens 180 can be placed between source 150 and the device 312 during its assembly to shape the illumination pattern so that light 152 is directed toward surface 271 of photocurable material 270 and covers a sufficiently large area of the bondline. If the element 300 has been processed on one or more of its surfaces (e.g., bottom surface 304 or side surface 302) with a coating 301 or other treatment that blocks transmission of the curing (actinic) radiation, or is made of a material that does not transmit the curing radiation, the portion 270B of adhesive 270 that is not directly illuminated by radiation 152 from source 150 will not cure at an appreciable rate. As a result, the bond between structure 310 and element 300 may be less than adequate for a substantial time until portion 270B has cured without benefit of radiation 152.

Figure 2:
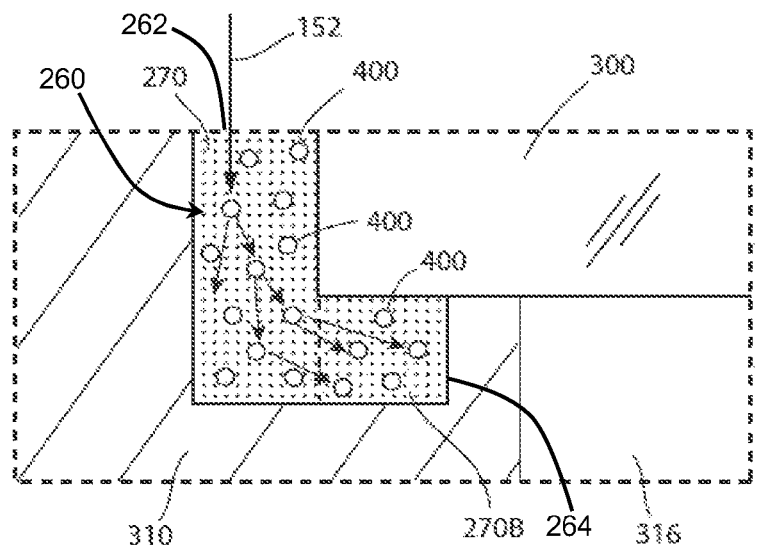
FIG. 2 is an alternative close-up inset in which the adhesive composition of FIG. 1 is replaced with an adhesive composition containing a structured optical particulate material that is capable of scattering light throughout portions of the adhesive composition that are blocked or obstructed from receiving radiation directly.

FIG. 2 shows an alternative close-up inset of an assembly or device similar to that shown in FIG. 1, using an adhesive composition 260 comprising a structured optical particulate material 400 dispersed throughout photocurable composition 270. The adhesive composition 260 includes a proximal end 262 where curing radiation 152 is initially incident thereon and a distal end 264 that resides underneath element 300. Structured optical particulate material 400 transmits curing radiation 152 to region 270B of photocurable composition 270 via a scattering mechanism, while region 270B is blocked from receiving curing radiation 152 directly through element 300.

Structured optical particulate material 400 of adhesive composition 260 acts as a waveguide for curing radiation 152 to redirect the curing radiation to areas (e.g., region 270B) in the photocurable composition 270 (e.g., adhesive, sealant or potting composition) of adhesive composition 260 that would otherwise be obstructed from receiving radiation 152 directly from source 150.

Figure 3:
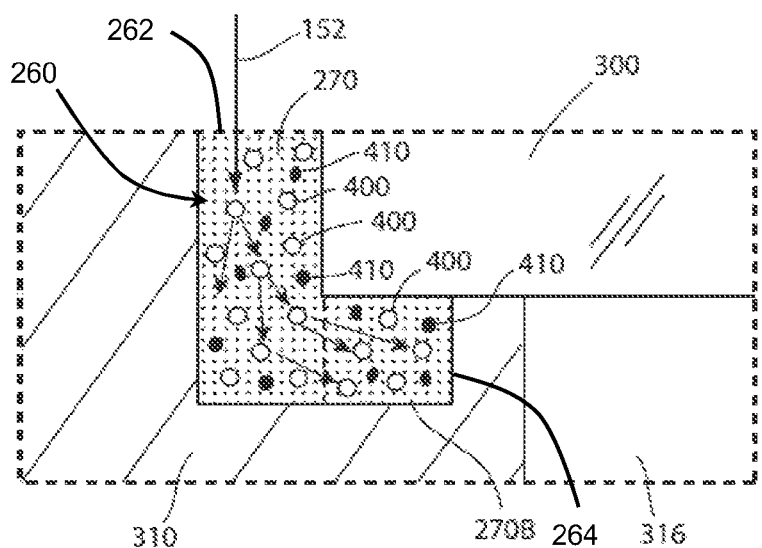
FIG. 3 is an alternative close-up inset in which the adhesive composition of FIG. 1 or 2 is replaced with an adhesive composition containing both a structured optical particulate material that is capable of scattering light through portions of the adhesive compositions that are blocked or obstructed from receiving radiation directly, and a second particulate material that is capable of absorbing radiation of a wavelength that is different from the wavelength of the curing radiation.

FIG. 3 shows a slightly modified alternative close-up inset of an assembly or device similar to that shown in FIGS. 1 and 2, using an adhesive composition that contains a structured optical particulate material 400 dispersed throughout composition 270 and a second particulate material 410 that absorbs radiation at a wavelength or wavelength spectrum or range that is different from the wavelength or wavelength spectrum or range of the curing radiation. The purpose of second particulate material 410 is to absorb radiation (e.g., ultraviolet radiation, usually of a wavelength shorter than that of the operating wavelengths used in the device 312) that would cause degradation of the cured product of adhesive composition 270.

Figure 4:
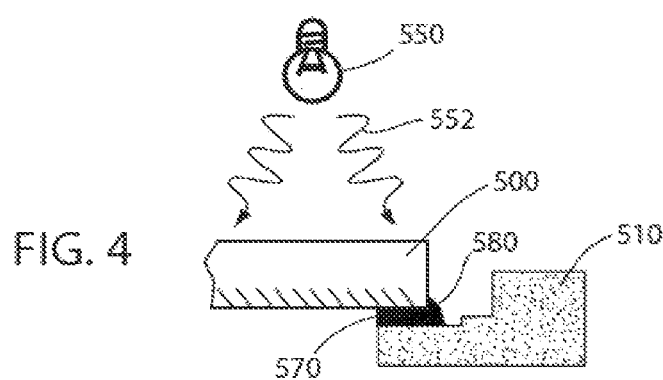
FIG. 4 is a schematic illustration of a device in which adhesion between a mirrored optical element and a metal holder is improved by adding, to a radiation-curable adhesive, a structured optical particulate material that is capable of scattering light through portions of the adhesive compositions that are blocked or obstructed from receiving radiation directly.

FIG. 4 schematically illustrates a device 512 using an ultraviolet radiation-curable adhesive composition 570 to bond a mirror 500 to a metal holder 510. The mirrored surface prevents direct illumination of the bondline from the curing radiation 552 emitted from radiation source 550. A small portion 580 of adhesive composition 570 that extends outwardly beyond the outer diameter of mirror 500 is exposed to radiation 552 and is redirected by structured optical particulate material in adhesive composition 570 to the larger portion of adhesive composition 570 that is obstructed from receiving radiation 552 directly from source 550.

Pushout force testing to determine the force needed to break an adhesive bondline between an optical element and a holder in an arrangement similar to that described above and illustrated in FIG. 4 demonstrate that light scattered by the structured optical particulate material (e.g., fused silica microspheres) facilitates a complete cure of a bondline shielded from direct illumination by a coating, which cure is equivalent to an otherwise identical arrangement in which the bondline is not shielded and receives direct illumination. This result demonstrates that addition of the structured optical particulate filler facilitates radiation induced curing at obstructed portions of the adhesive composition that would not otherwise cure within an acceptable timeframe.

The optical elements fixed to the support structures of the devices disclosed herein can be reflective elements such as a mirror, refractive elements such as a refractive lens, or diffractive elements such as refractive gratings or lenses.

The described embodiments are preferred and/or illustrated, but are not limiting. Various modifications are considered within the purview and scope of the appended claims.

What is claimed is:

1. An adhesive composition comprising:
    a photocurable material that is substantially transparent to and curable by radiation of a first wavelength, and
    a structured optical particulate material dispersed throughout the photocurable material, the structured optical particulate material being capable of scattering the radiation of the first wavelength throughout the photocurable material while not rendering adhesive composition opaque to the radiation of the first wavelength.

2. The adhesive composition of claim 1, in which the structured optical particulate material is fused silica microspheres.

3. The adhesive composition of claim 1, in which the structured optical material is capable of absorbing light of a second wavelength.

4. The adhesive composition of claim 1, further comprising a second particulate material that absorbs radiation of a second wavelength.

5. An optical device comprising:
    a support structure configured to retain an optical element;
    an optical element positioned on the support structure; and
    a cured adhesive composition of claim 1 disposed between a surface of the support structure and a surface of the optical element to adhesively bond the optical element to the support structure, the cured adhesive composition having a cross-linked polymer matrix material and the structured optical particulate material dispersed throughout the matrix.

6. The optical device of claim 5, in which at least a section of the cured adhesive composition is disposed in a region between the optical element and the support structure that is not within a direct illumination path of the radiation of the first wavelength.

7. The optical device of claim 5, in which the structured optical particulate material is fused silica microspheres.

8. The optical device of claim 5, in which at least a section of the cured adhesive composition is disposed in a region between the optical element and the support structure that is shielded from a direct illumination path of the radiation of the first wavelength by a coating applied to a surface of the optical element.

9. The optical device of claim 5, in which the optical element is a lens or mirror.

10. A process for adhesively attaching an optical element to a support structure, comprising:
    positioning the optical element on the support structure with a photocurable adhesive composition of claim 1 disposed between a surface of the support structure and a surface of the optical element; and
    directing at the photocurable adhesive composition the radiation of the first wavelength.

11. The process of claim 10, in which at least a portion of the adhesive composition is disposed in a region between the optical element and the support structure that is not within a direct illumination path of the radiation of the first wavelength.

12. The process of claim 10, in which the structured optical particulate material is fused silica microspheres.

13. The process of claim 10, in which at least a section of the cured adhesive composition is disposed in a region between the optical element and the support structure that is shielded from a direct illumination path of the radiation of the first wavelength by a coating applied to a surface of the optical element.

14. The process of claim 10, further comprising applying a surface treatment or coating to a portion of the surface of the optical element before directing the radiation at the photocurable adhesive composition, wherein the surface treatment or coating shields at least a region of the adhesive composition from receiving the radiation along a direct illumination path.

15. The process of claim 10, in which the optical member is a lens or mirror.

16. The process of claim 10, in which the structured optical material is capable of absorbing light of a second wavelength.

17. The process of claim 10, further comprising a second particulate material that absorbs radiation of a second wavelength.

18. The adhesive composition of claim 1, further comprising a proximal end and a distal end, and wherein the radiation of the first wavelength is incident upon the proximal end and is transmitted from the proximal end to the distal end via said scattering when the radiation of the first wavelength is made incident upon the proximal end.

19. The process of claim 10, wherein the photocurable adhesive composition has a proximal end and a distal end, and wherein the radiation of the first wavelength is made incident upon the proximal end and is transmitted from the proximal end to the distal end via said scattering.

20. The process of claim 19, wherein the distal end of the photocurable adhesive composition is not within a direct illumination path of the radiation of the first wavelength.

* * * * *

UNITED STATES PATENT AND TRADEMARK OFFICE
CERTIFICATE OF CORRECTION

| | |
|---|---|
| PATENT NO. | : 9,753,190 B2 |
| APPLICATION NO. | : 14/012355 |
| DATED | : September 5, 2017 |
| INVENTOR(S) | : Paul Gerard Dewa et al. |

It is certified that error appears in the above-identified patent and that said Letters Patent is hereby corrected as shown below:

On the Title Page

In item (56), in Column 2, under "Other Publications", Line 1, delete "Se arch" and insert -- Search --.

In item (74), in Column 2, in "Attorney, Agent, or Firm", Line 1, delete "Svellana" and insert -- Svetlana --.

In the Claims

In Column 5, Line 30, in Claim 1, after "rendering" insert -- the --.

Signed and Sealed this
Ninth Day of January, 2024

Katherine Kelly Vidal
*Director of the United States Patent and Trademark Office*